United States Patent [19]

Stark

[11] 4,228,821
[45] Oct. 21, 1980

[54] GAS-TIGHT BALL VALVE

[75] Inventor: Karl Stark, Täuffelen, Switzerland

[73] Assignee: Saphirwerk Industrieprodukte AG, Nidau, Switzerland

[21] Appl. No.: 913,575

[22] Filed: Jun. 7, 1978

[51] Int. Cl.³ .............................................. F16K 15/04
[52] U.S. Cl. ................................. 137/533.11; 251/368
[58] Field of Search ................... 137/533.11; 251/368; 137/539, 539.5

[56] References Cited

U.S. PATENT DOCUMENTS

| | | | |
|---|---|---|---|
| 2,695,628 | 11/1954 | Wheildon, Jr. ................. | 137/533.11 |
| 3,055,391 | 9/1962 | Shuk et al. ................... | 137/533.11 X |
| 3,264,718 | 8/1966 | Paul, Jr. ...................... | 251/368 X |
| 3,887,162 | 6/1975 | Antoni et al. ................. | 251/368 X |
| 3,964,510 | 6/1976 | Roller .......................... | 137/533.11 X |

*Primary Examiner*—William R. Cline
*Attorney, Agent, or Firm*—Wender, Murase & White

[57] ABSTRACT

A gas-tight ball valve having a ball and a valve seat made of hard material such as sapphire or ruby, wherein said valve seat has two annular surfaces forming between them an edge with an obtuse angle, the ball resting on one of said surfaces, and a method for producing the valve seat by lapping said surfaces and then polishing them for breaking the edge between such surfaces.

6 Claims, 2 Drawing Figures

GAS-TIGHT BALL VALVE

BACKGROUND OF THE INVENTION

The manufacture of gas-tight valves, particularly of gas-tight ball valves has proved to be difficult in the past because materials can hardly be found for the valve ball and for the valve seat warranting sufficient sealing effect and housing sufficiently gas-tight characteristics for avoiding diffusion of gases.

SUMMARY OF THE INVENTION

This invention is based on the surprising discovery that very hard materials such as sintered ceramics, sapphire, ruby and the like may be used for the ball and the valve seat and that excellent gas-tightness may be obtained therewith. However, care must be taken not to damage the valve seat or ball consisting of the very hard and brittle material when the valve ball falls onto the valve seat. According to this invention the valve seat has a broken edge between two annular surfaces forming between them an obtuse angle, whereby the valve ball rests on one of said surfaces. It has been found that with this form of the valve seat having a broken or slightly chamfered edge, both excellent gas-tightness and high life time may be achieved when the above hard materials are used.

This invention will now be explained in detail with reference to the accompanying drawing showing, by way of example, a preferred embodiment of the gas-tight ball valve.

DESCRIPTION OF THE PREFERRED EMBODIMENT

Figure 1:
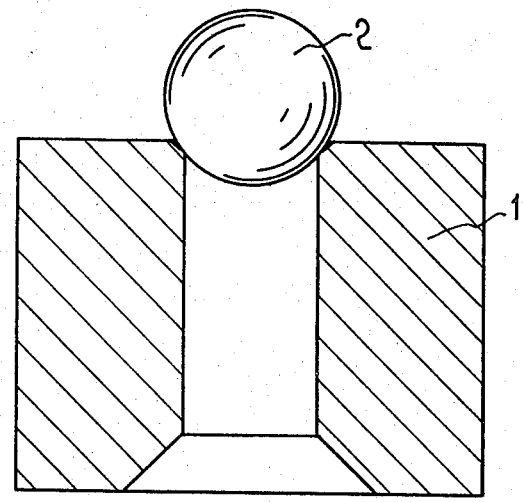
FIG. 1 is a front view of a preferred embodiment of a gas-tight ball valve according to the present invention showing the valve seat in section with the valve ball aplied thereon.
Figure 2:
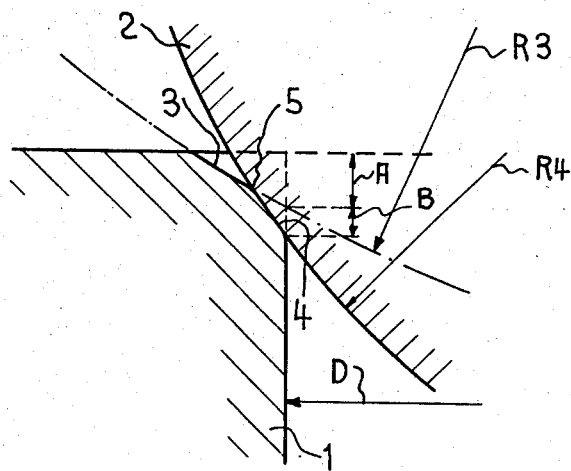
FIG. 2 is a partial section of the ball valve illustrating the valve seat and the ball on a substantially enlarged scale.

The valve seat 1 and the valve ball 2 are made of a hard and gas-tight material selected from the group consisting of sintered ceramics containing $Si_3N_4$ or $Al_2O_3$, sapphire and ruby. As shown in FIG. 2, annular surfaces of a specific shape are formed at the upper end of the valve bore in valve seat 1. These are two annular surfaces or chamfers 3 and 4 of spheric shape with the radii R3 and R4 respectively. The annular surfaces 3 and 4 form an obtuse angle between each other in a blunt or broken edge 5. The valve ball 2 rests on the inner sealing surface 4 while some clearance remains between the ball and surface 3. A conical surface adapted to the mean inclination of the surface 3 preferably has an aperture angle of 90 to 120 degrees. In other words, the mean inclination of surface 3 relative to the axis of the valve bore is 45 to 60 degrees. With a diameter D of the valve bore of 1.2 millimeters, the radius R3 is 1.25 millimeters and the radius R4 is 0.75 millimeters, the radius of the ball 2 being also 0.75 millimeters. The radial width as measured or seen in projection in the direction of the valve axis of both surfaces 3 and 4 together is 0.08 millimeters whereby the radial width of the surface 4 as measured in the said projection is 0.03 millimeters, the axial distance A is 0.055 millimeters and the axial distance B is 0.027 millimeters.

The shape and dimensions of the surfaces forming the valve seat have been selected under consideration of the following important aspects:

The valve ball must not stick to the valve seat. The hard material of the valve ball and valve seat should not break out or splinter off under the impact of the valve ball when the valve is closed. This is achieved by the shape and angle of the auxiliary surface 3 and by breaking the edge or angle between surfaces 3 and 4. Even when the ball falls onto the valve seat in a slightly eccentric position, it is guided into the central position on the rest surface 4 without parts of the ball or of the valve seat being overstressed and thus damaged. Therefore, surface 3 may also be considered as a reinforcing surface.

In the manufacture of the valve seat, surfaces 3 and 4 are first lapped and the so formed valve seat is then polished by means of brushes. By this polishing action edge 5 and the outer edges of surfaces 3 and 4 are broken. In this manner soft transition zones or edges are formed whereby breaking out or splintering of the material by the impact of the valve ball is prevented. The sealing surface 4 is preferably lapped by means of a hard-metal ball having a diameter exactly equal to the diameter of the valve ball to be used.

With the valve disclosed herein or with a similar valve, gas tightness for pressures of up to 600 bars are obtained. Usually the same material is used for the valve seat 1 and for the ball 2. Instead of the materials mentioned above, hard-metal or the like may also be used.

The valve may be used in any usual valve structure. As an example, the ball may rest on the valve seat by its own weight only, the ball being additionally pressed against the seat by pressure acting from above and the ball being lifted for opening the valve by pressure from below. Of course the ball may also be loaded and pressed against the valve seat by a spring acting onto the ball. Further, instead of being lifted off the valve seat by pressure from below, the ball may also be lifted off the valve seat by means of an actuating pin extending through the bore of valve body 1.

What is claimed is:

1. A gas-tight ball valve having a ball loosely resting on a valve seat made each of hard material, said valve seat being formed on a seat body having a bore and a face extending substantially radially outwardly from said bore, said valve seat being formed at the boundary between said bore and said face and having a broken edge between an inner spheric annular surface adjacent said bore and an outer spheric annular surface adjacent said face, each of said spheric annular surfaces having a radial width, the diameter of said valve bore, the radius of the ball, the radial width of said inner annular surface and the radial width of said outer annular surface being in a proportion of substantially 120:75:3:5.

2. A valve according to claim 1, wherein said valve ball and said valve seat are made of material selected from the group consisting of sintered ceramics containing $Si_3N_4$ or $Al_2O_3$.

3. A valve according to claim 1, wherein said inner surface has a radial width as measured in a plane perpendicular to said valve axis of 0.03 millimeters.

4. A valve according to claim 1, wherein said inner spheric surface has a radius in the order of 0.75 millimeters, said outer spheric surface has a radius in the order of 1.25 millimeters, and said valve ball has a diameter of 1.5 millimeters.

5. A valve according to claim 1, wherein the inclination of said outer surface relative to the axis of the valve is in the order of 45 to 60 degrees.

6. A valve according to claim 1, wherein said valve ball and said valve seat are made of material selected from the group consisting of sapphire or ruby.

* * * * *